United States Patent
Poole et al.

(10) Patent No.: US 7,316,000 B2
(45) Date of Patent: *Jan. 1, 2008

(54) INTERACTIVE AGENT FOR A TOPOLOGICAL MULTI-TIER BUSINESS APPLICATION COMPOSER

(75) Inventors: Rebecca L. Poole, San Jose, CA (US); Laurence E. England, Morgan Hill, CA (US); Howard J. Glaser, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 620 days.

This patent is subject to a terminal disclaimer.

(21) Appl. No.: 09/939,846

(22) Filed: Aug. 27, 2001

(65) Prior Publication Data

US 2004/0205691 A1    Oct. 14, 2004

(51) Int. Cl.
*G06F 9/44* (2006.01)
(52) U.S. Cl. .................. 717/104; 717/109; 717/113
(58) Field of Classification Search ........ 717/100–103, 717/106, 108, 109
See application file for complete search history.

(56) References Cited

U.S. PATENT DOCUMENTS

| | | | |
|---|---|---|---|
| 5,485,615 A * | 1/1996 | Wennmyr | 717/109 |
| 5,745,765 A * | 4/1998 | Paseman | 717/107 |
| 5,848,273 A | 12/1998 | Fontana et al. | |
| 5,889,520 A | 3/1999 | Glaser | |
| 5,987,247 A | 11/1999 | Lau | |
| 6,151,584 A | 11/2000 | Papierniak | |
| 6,208,345 B1 * | 3/2001 | Sheard et al. | 345/853 |

(Continued)

FOREIGN PATENT DOCUMENTS

CA    2191640    11/1996

(Continued)

OTHER PUBLICATIONS

Sundsted et al., "Application Composer shows promise", May 2001, retrieved from <URL:http://www.javaworld.com/javaworld/jw-05-2001/jw-0511-iw-webgain.html> on Aug. 3, 2004.*

(Continued)

*Primary Examiner*—Mary Steelman
(74) *Attorney, Agent, or Firm*—Gates & Cooper LLP

(57) ABSTRACT

A computer-implemented Integrated Development Environment (IDE) for use in constructing a multi-tier business application for a multiple tier computer network. The IDE is used to create and maintain the multi-tier business application quickly and easily on the multiple tier computer network. The IDE includes a Topological Multi-Tier Business Application Composer and associated Meta-model, wherein the Composer allows the developer to graphically design, develop, maintain, build, test, debug, and deploy the multi-tier business application and the graphical representation of the multi-tier business application is then persistently stored in the Meta-model The IDE also includes an Interactive Agent that monitors the Meta-model for an occurrence of a specific event and then triggers the display of a dialog box or other graphical element in the user interface of the IDE to interact with the developer by displaying context information comprising a list of suggested and recommended actions that advance the creation of the multi-tier business application.

12 Claims, 7 Drawing Sheets

U.S. PATENT DOCUMENTS

| | | | |
|---|---|---|---|
| 6,237,135 B1* | 5/2001 | Timbol | 717/107 |
| 6,272,673 B1* | 8/2001 | Dale et al. | 717/100 |
| 6,370,544 B1* | 4/2002 | Krebs et al. | 707/104.1 |
| 6,425,121 B1* | 7/2002 | Phillips | 717/109 |
| 6,957,191 B1* | 10/2005 | Belcsak et al. | 705/38 |
| 7,000,190 B2* | 2/2006 | Kudukoli et al. | 715/763 |
| 2002/0078432 A1* | 6/2002 | Charisius et al. | 717/102 |
| 2002/0104067 A1* | 8/2002 | Green et al. | 717/101 |
| 2002/0184610 A1* | 12/2002 | Chong et al. | 717/109 |
| 2006/0009944 A1* | 1/2006 | Shah et al. | 702/123 |

FOREIGN PATENT DOCUMENTS

| | | |
|---|---|---|
| JP | 10055339 | 2/1998 |
| WO | WO 00/02137 | 1/2000 |
| WO | WO 00/04478 | 1/2000 |

OTHER PUBLICATIONS

Gong, Baojun; Shuqing Wang, Model of MAS: Supporting Dynamic Enterprise Model. IEEE: Proceedings of the 3rd World Congress on Intelligent Control and Automation (Cat. No. 00EX393) vol. 3, pp. 2042-2046. Published: Piscataway, NJ, 2000, 5 vol. 3828 pages. (Abstract only).

Marques, P.J.; L.M. Silva, J.G. Silva. A Flexible Mobile-agent Framework for Accessing Information Systems in Disconnected Computing Environments. IEEE: Proceedings of 11th International Workshop on Database and Expert Systems Applications, pp. 173-177. Published: Los Alamitos, CA, 2000, XXVII+1164 pages. (Abstract only).

Murthy, V.K.; E.V. Krishnamurthy; A Pham. Distributed Object Models, Mobile Computing and Electronic Commerce. IEEE: Proceedings of the 1998 ICPP Workshop on Architectural and OS Support for Multimedia Applications Flexible Communication Systems. Wireless Networks and Mobile Computing (Cat. No. 98EX206) pp. 134-143. Published: Los Alamitos, CA, 1998, VII+155 pages. (Abstract only).

Christophides V. and A. Rizk. "Querying Structured Documents with Hypertext Links using OODMS," Proceedings of the 1994 ACM European conference on Hypermedia technology, pp. 186-197, 1994. (Abstract only).

Hutchinson, G.D. Optimizing Use of Local Coordinators in Distributed Applications, IBM Technical Disclosure Bulletin, vol. 40, No. 2, Feb. 1997 pp. 199-204.

* cited by examiner

US 7,316,000 B2

INTERACTIVE AGENT FOR A TOPOLOGICAL MULTI-TIER BUSINESS APPLICATION COMPOSER

CROSS-REFERENCE TO RELATED APPLICATION

This application is related to co-pending and commonly-assigned U.S. patent application Ser. No. 09/939,813, filed on Aug. 27, 2001, by Rebecca Lau Poole, Howard J. Glaser, and Laurence E. England, entitled "TOPOLOGICAL MULTI-TIER BUSINESS APPLICATION COMPOSER," which application is incorporated by reference herein.

BACKGROUND OF THE INVENTION

1. Field of the Invention

This invention relates in general to programming development environments performed by computers, and in particular, to the use of a programming development environment for Internet and Intranet applications.

2. Description of Related Art

With the fast growing popularity of the Internet and Intranets, especially Web-based networks, there is also a fast growing demand for tools that aid in the construction of multi-tier Web-based business applications. However, it is difficult to create such applications.

Developers need tools that assist and ease the complexity of the development and maintenance of their multi-tier business applications. Ideally, a graphical presentation of the multi-tier business application would be useful. In addition, there should be a mechanism to graphically design, develop, maintain, build, test, debug, and deploy the multi-tier business applications.

Developers also need a tool that possesses knowledge and understanding of the various components found in the multi-tier business applications. Such a tool should monitor the actions of the developer and guide the developer through the process of composing the multi-tier business application.

Thus, there is a need in the art for systems that assist in the development of business applications on the Internet or Intranet, and especially via Web-based networks. Further, there is a need for simplified development environments for such systems.

SUMMARY OF THE INVENTION

To overcome the limitations in the prior art described above, and to overcome other limitations that will become apparent upon reading and understanding the present specification, the present invention discloses a computer-implemented Integrated Development Environment (IDE) for constructing a multi-tier business application for a multiple tier computer network. The IDE is used to create and maintain the multi-tier business application quickly and easily on the multiple tier computer network.

The IDE includes a Topological Multi-Tier Business Application Composer and associated Meta-model wherein the Composer allows the developer to graphically design, develop, maintain, build, test, debug, and deploy the multi-tier business application and the graphical representation of the multi-tier business application is then persistently stored in the Meta-model.

The IDE also includes an Interactive Agent that monitors the Meta-model for an occurrence of a specific event and then triggers the display of a dialog box or other graphical element in the user interface of the IDE to interact with the developer by displaying context information comprising a list of suggested and recommended actions that advance the creation of the multi-tier business application.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Integrated Development Environment (IDE) for constructing a multi-tier business application for a multiple tier computer network. The IDE is used to create and maintain components of the multi-tier business application quickly and easily on the multiple tier computer network. Moreover, the IDE is powerful, yet extremely easy to use.

The IDE includes a Topological Multi-Tier Business Application Composer and associated Meta-model, wherein the Composer allows the developer to graphically design, develop, maintain, build, test, debug, and deploy the multi-tiet business application and the graphical representation of the multi-tier business application is then persistently stored in the Meta-model.

The IDE also includes an Interactive Agent that monitors the Meta-model for an occurrence of a specific event and then triggers the display of a dialog box or other graphical element in the user interface of the IDE to interact with the developer by displaying context information comprising a list of suggested and recommended actions that advance the creation of the multi-tier business application.

In the preferred embodiment, the IDE, Topological Multi-Tier Business Application Composer, Meta-model, and Interactive Agent each comprises logic and/or data embodied in or readable from a device, media, carrier, or signal, e.g., one or more fixed and/or removable data storage devices connected directly or indirectly to a computer, one or more remote devices coupled to the computer via a data communications device, etc. Thus, the invention may be implemented as a method, apparatus, or article of manufacture.

Hardware Environment

Figure 1:
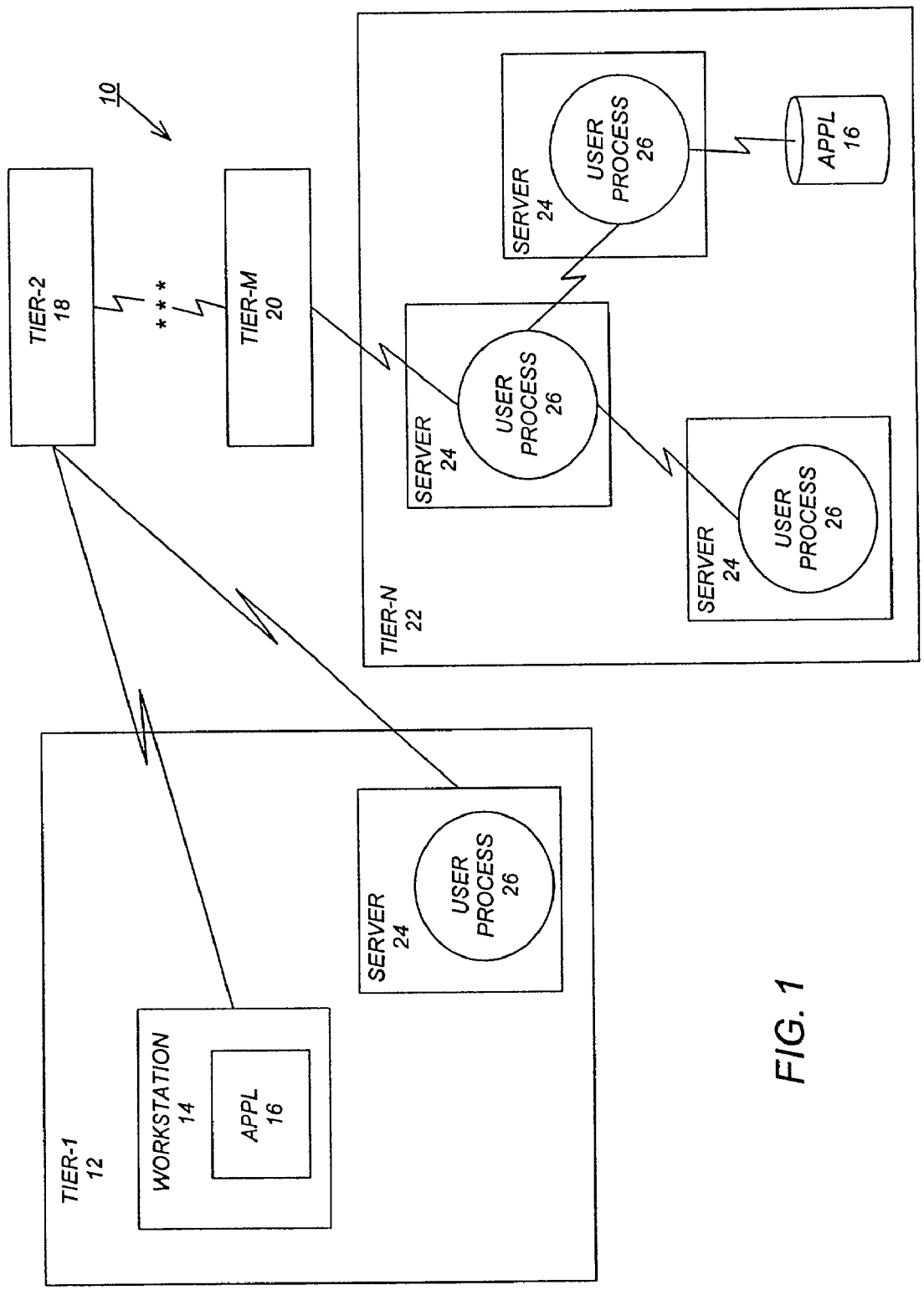
FIG. 1 is a block diagram that illustrates an exemplary multiple tier network architecture according to the preferred embodiment of the present invention.

FIG. 1 is a block diagram that illustrates an exemplary multiple tier network architecture 10 according to the preferred embodiment of the present invention. In this example, Tier-1 12 is comprised of one or more workstations 14 that execute one or more application files 16, while Tier-2 18 through Tier-M 20 are comprised of one or more servers that are connected together to act primarily for transport purposes (although other functionality may be provided on these tiers as well). In addition, Tier-N 22 is connected to Tier-M 20 and is comprised of one or more servers 24 that execute a plurality of user-defined processes 26, where at least one of the user-defined processes 26 accesses one or more application files 16. The user-defined processes 26, and the application files 16, may comprise logic and/or data.

Those skilled in the art will recognize that any number of different configurations of tiers and components thereof could be used without departing from the scope of the present invention. For example, FIG. 1 shows that Tier-1 12 also includes one or more servers 24 that execute one or more user-defined processes 26, as well as workstation 14 and application files 16. Consequently, any tier 12, 18 or 20 may include any component or combination of components.

Note also that each of the tiers, workstations, or servers may comprise separate computer hardware platforms as shown in FIG. 1, or may comprise a single computer hardware platform, or may comprise some combination thereof. Moreover, each of the computers may each include, inter alia, one or more processors, memory, keyboard, or display, and may be connected locally or remotely to fixed and/or removable data storage devices and/or data communications devices. In addition, each of the computers in each of the tiers also could be connected to other computers via the data communications devices.

Integrated Development Environment

Figure 2:
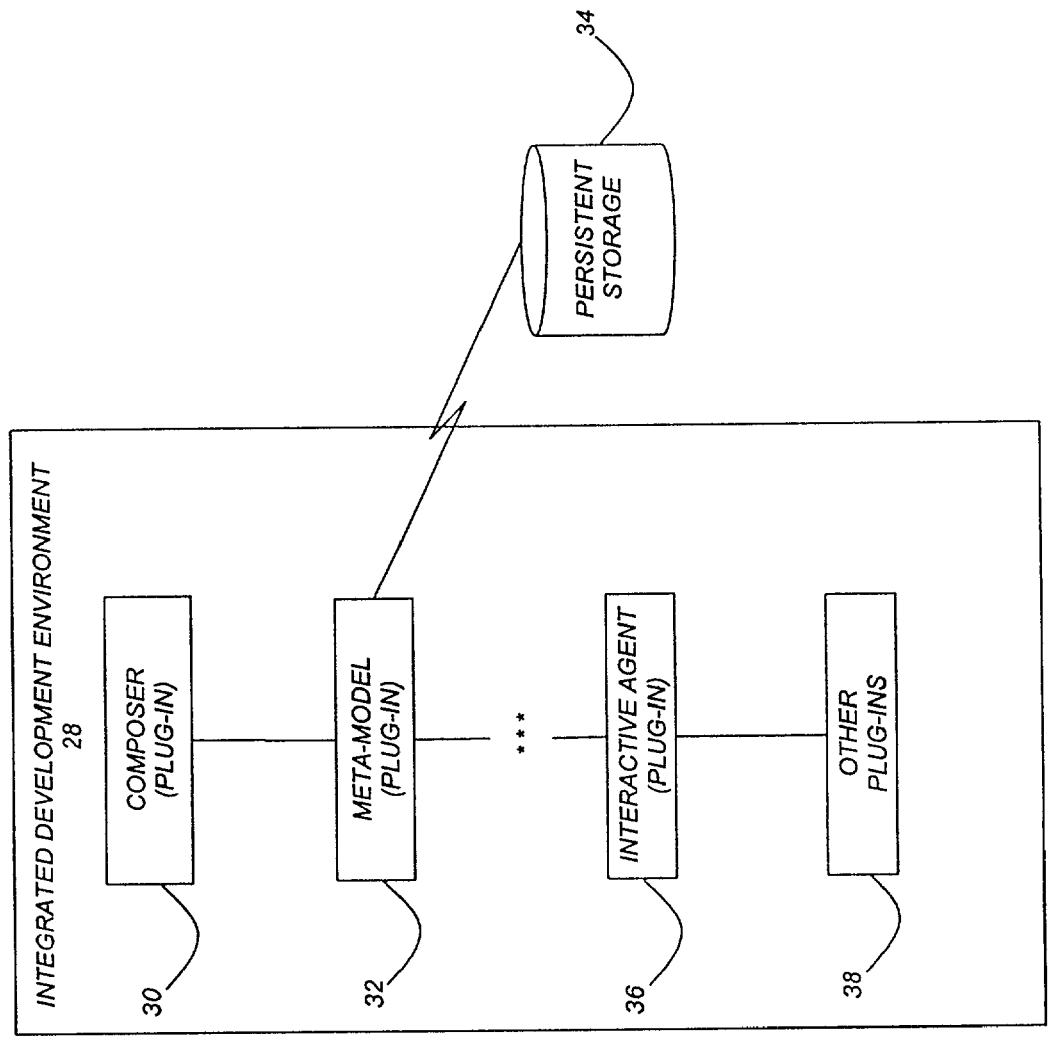
FIG. 2 is a block diagram that illustrates an integrated development environment (IDE) according to the preferred embodiment of the present invention.

FIG. 2 is a block diagram that illustrates an integrated development environment (IDE) according to the preferred embodiment of the present invention. In the preferred embodiment, the application 16 executed by the workstation 14 in Tier-1 12 comprises the IDE 28. The IDE 28 supports the ability of the developer to create and maintain a multi-tier business application. Specifically, the IDE 28 is comprised of a Topological Multi-Tier Business Application Composer 30 and associated Meta-model 32, wherein the Composer 30 allows the developer to graphically design, develop, maintain, build, test, debug, and deploy the multi-tier business application.

The Meta-model 32 of the IDE 28 captures all the information entered via the Topological Multi-Tier Business Application Composer 30 and persistently stores 34 this information in a database, file system, XML file, or other structure, so that the representation of the multi-tier business application is accessible to other tools that may need to collaborate with the Composer 30. The Meta-model 32 is updated and kept in synchronization with any updates made to the multi-tier business application via the Composer 30. In addition, the Composer 30 has the ability to import and export portions of or the entire multi-tier business application to or from the Meta-model 32 for various purposes, ranging from reuse of certain components to reuse of an entire multi-tier business application. Likewise, the Composer 30 has the capability to print out the graphical representation of the multi-tier business application from the Meta-model 32.

In the preferred embodiment, the IDE 28 comprises a framework that accepts one or more additional "plug-ins" that provide functionality to the framework. One such plug-in is an Interactive Agent 36, which is described in more detail below. Other plug-ins 38 can be used to customize the IDE 28 to provide any number of appropriate viewers, editors, browsers, or other tools to support the developer's needs.

Figure 3:
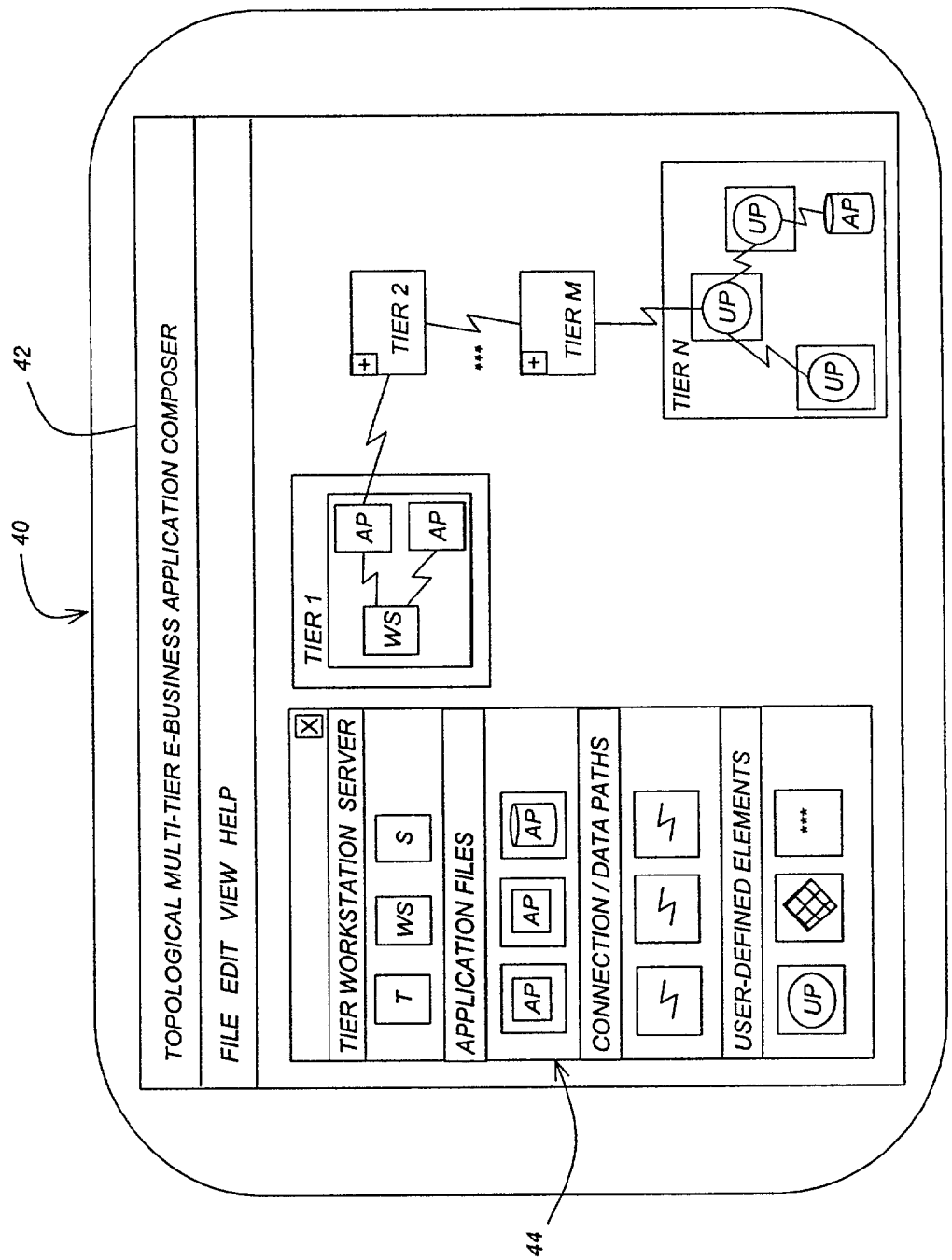
FIG. 3 illustrates a user interface displayed by an integrated development environment (IDE) according to the preferred embodiment of the present invention.

FIG. 3 illustrates a user interface 40 displayed by the IDE 28 according to the preferred embodiment of the present invention. The user interface 40 includes a Topological Multi-Tier Business Application Composer window 42, which is used by the developer to graphically design, develop, maintain, build, test, debug, and deploy a multi-tier business application. Generally, in the composition, modification and maintenance of the multi-tier business application, the developer uses the window 42 to perform, in an iterative manner, a number of different actions, including but not limited to, the following:

Creating the various tiers involved in the multi-tier business application;

Specifying the components of each tier, such as workstations, servers, application files, connections, data paths, user-defined processes, etc.;

Specifying the properties to uniquely identify each tier and its components in the multi-tier business application; and Completing and refining the contents of each tier and its components in the multi-tier business application.

When creating a multi-tier application, the developer generally first decides on the number of tiers and what platforms they will be realized upon. The next step is to identify the workstations and servers within each of the tiers. The final step is to define the processing performed by each tier and its components, layer by layer, or area by area.

In the preferred embodiment, the Composer window 42 includes a tool palette 44 containing graphical constructs (i.e., icons representing tiers ( ), workstations (ES), servers (S), application files (AP), connections, data paths, user-defined processes (UP), other user-defined elements, etc.), which make up a graphical presentation of the multi-tier business application. These icons can be dragged from the palette 44 onto the window 42, and thereafter connected together, in order to design, develop, maintain, build, test, debug, and deploy a topological structure to the multi-tier business application. Note that the window 42 of FIG. 3 provides a graphical presentation of the multi-tier business application from FIG. 1.

Note also that the graphical constructs in the window $^{42}$ may contain one or more graphical sub-constructs that are expandable and/or collapsible. For example, in FIG. 3, Tier-2 and Tier-M are collapsed boxes, as indicated by the "+" that can be expanded, if so selected by the developer. This allows the developer to control the viewing and emphasis of what is of importance to them during various phases of the development life cycle.

The window 42 also provides basic graphical composition functionalities, such as the following:

Under the File menu of the window 42, there are provided the following functions: Open (open an existing application), New (create a new application), Import (import an application or subportion thereof, Export (export an application or subportion thereof), Print (print an application), Deploy (deploy the multi-tier business application), and Exit (terminate processing).

Under the Edit menu of the window 42, there are provided the following functions: Edit (edit an application), Select (select one or more components of an application), and Merge (merge the components from one tier to another tier in an application).

Under the View menu of the window 42, there are provided the following functions: Test Run (test an application to see the flow of information therethrough), Debug (debug an application in a simulation including the setting of breakpoints), Filter (controlling what components are viewed in the window 42), Zoom In (zoom in the display of an application), Zoom Out (zoom out the display of an application), and User-Defined Elements (specify user-defined elements for an application).

The window 42 also supports all other standard windowing constructs and functions, such as scrolling, drag and drop functionality, etc.

Interactive Agent

Figure 4:
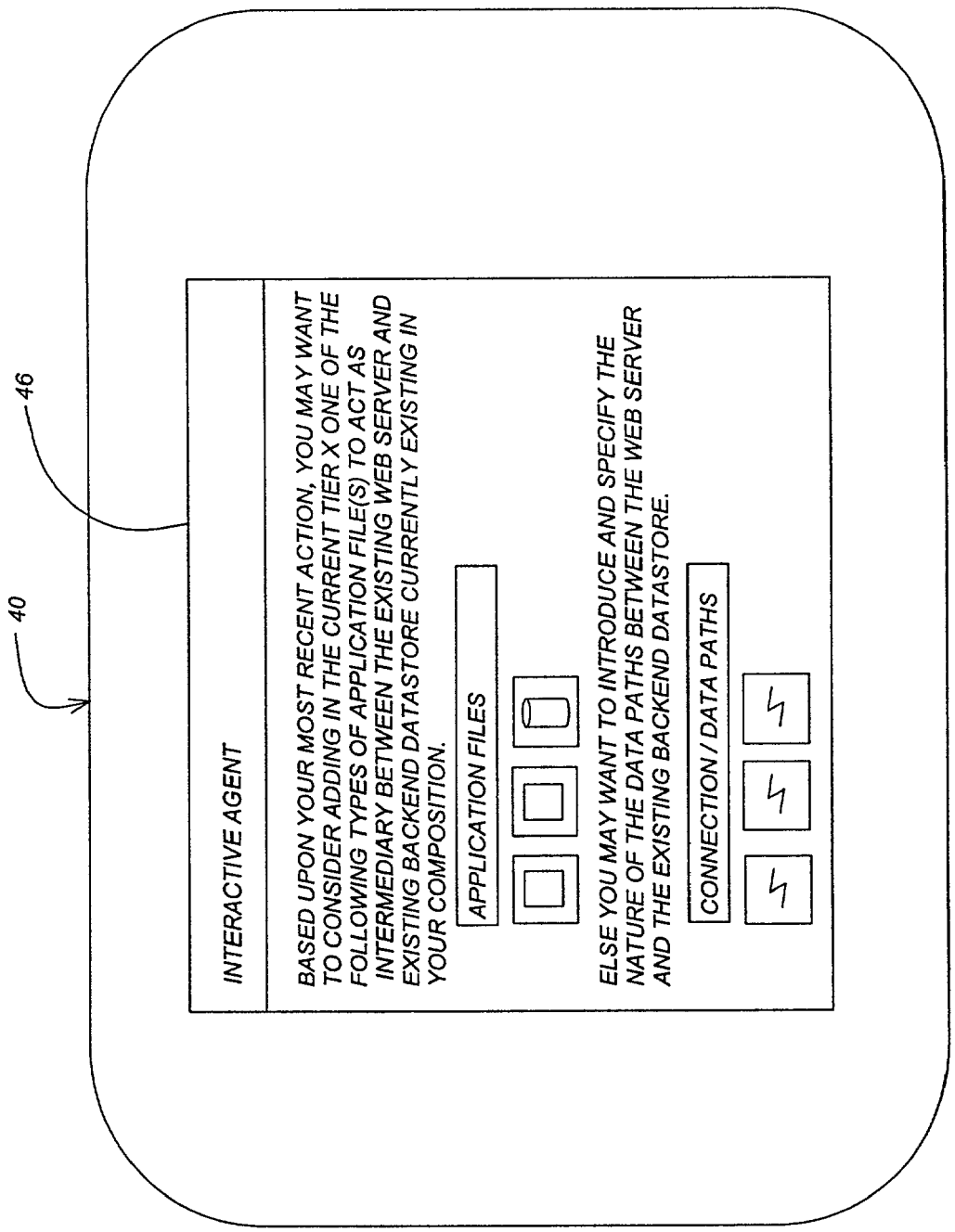
FIG. 4 illustrates a user interface displayed by an Interactive Agent of an integrated development environment (IDE) according to the preferred embodiment of the present invention.

FIG. 4 illustrates a user interface 40 displayed by the Interactive Agent 36 of the IDE 28 according to the preferred embodiment of the present invention. The Interactive Agent 36 provides functionality that results in a reduction in the complexity and difficulty encountered in the creation of the multi-tier business applications.

Specifically, the Interactive Agent 36 monitors the Meta-model 32 for an occurrence of a specific event and then triggers the display of a dialog box 46 or other graphical element in the user interface 40 to interact with the developer. The dialog box 46 displays context information comprising a list of suggested and recommended actions to advance the creation of the multi-tier business application. The developer's utilization of the suggestions and recommendations from the Interactive Agent 36 will result in a complete instantiation of the underlying Meta-model 32 as well as any appropriate supporting visual or non-visual elements associated with the window 42.

In a preferred embodiment, the Interactive Agent 36 operates from a knowledge base stored as a part of the Meta-model 34, wherein the knowledge base is structured in such a way that the occurrence of the specific event will cause the Interactive Agent 36 to access the knowledge base to identify the context information. For example, if the user has just created a mid-tier architecture with 3 servlets, all of which access the same target database table with exactly the same query, the Interactive Agent 36 may recommend that the developer create a common servlet that contains the query, and have each of these other servlets use the common servlet.

Preferably, the Interactive Agent 36 includes both a Novice and Advanced Mode, although other modes may be used in alternative embodiments. In one embodiment, the Interactive Agent 36 is triggered in the Novice Mode when the specified event is selected from a group including, but not limited to, the following:

Opening a new window 42 for the first time, which may result in the display of information that informs the developer of the functions and features available in the window 42;

Adding a new type of graphical element to a window 42;

Repetitiously adding the same type of graphical element to the window 42;

Transitioning from one window 42 to another window 42;

Defining more than a predetermined number of tiers;

Defining less than a predetermined number of tiers;

Defining more than a predetermined number of workstations;

Defining less than a predetermined number of workstations;

Defining more than a predetermined number of applications;

Defining less than a predetermined number of applications;

Defining more than a predetermined number of data paths;

Defining less than a predetermined number of data paths; and

Failure to use a specified feature in a window 42 (e.g., based on an apparent non-awareness of the feature).

On the other hand, the Interactive Agent 36 is triggered in the Advanced Mode when the specified event comprises a possible imbalance in the portion or entire multi-tier business application based upon an heuristic analysis of the information gathered so far by the composition tool and stored within the Meta-model.

In the example of FIG. 4, the Interactive Agent 36 is triggered based upon the monitoring of the information instantiated in the underlying Meta-model 32, in combination with a sequence of recent tasks and actions performed by the developer during the construction of the multi-tier business application using the window 42 and palette 44. The dialog box 46 displayed by the Interactive Agent 36 makes a recommendation to the developer to consider the addition of an intermediary component between two existing components already in the graphical composition, based upon knowledge of the inputs and outputs from one piece to another and then constructing the list of candidate components. The developer can then select the components categorized by type (e.g., application file, data path, connection, user-defined process, etc.) to create an instance of the component. Thereafter, the presentation in the window 42 is updated accordingly, as is the Meta-model 32.

Logic of the Invention

Figure 5:
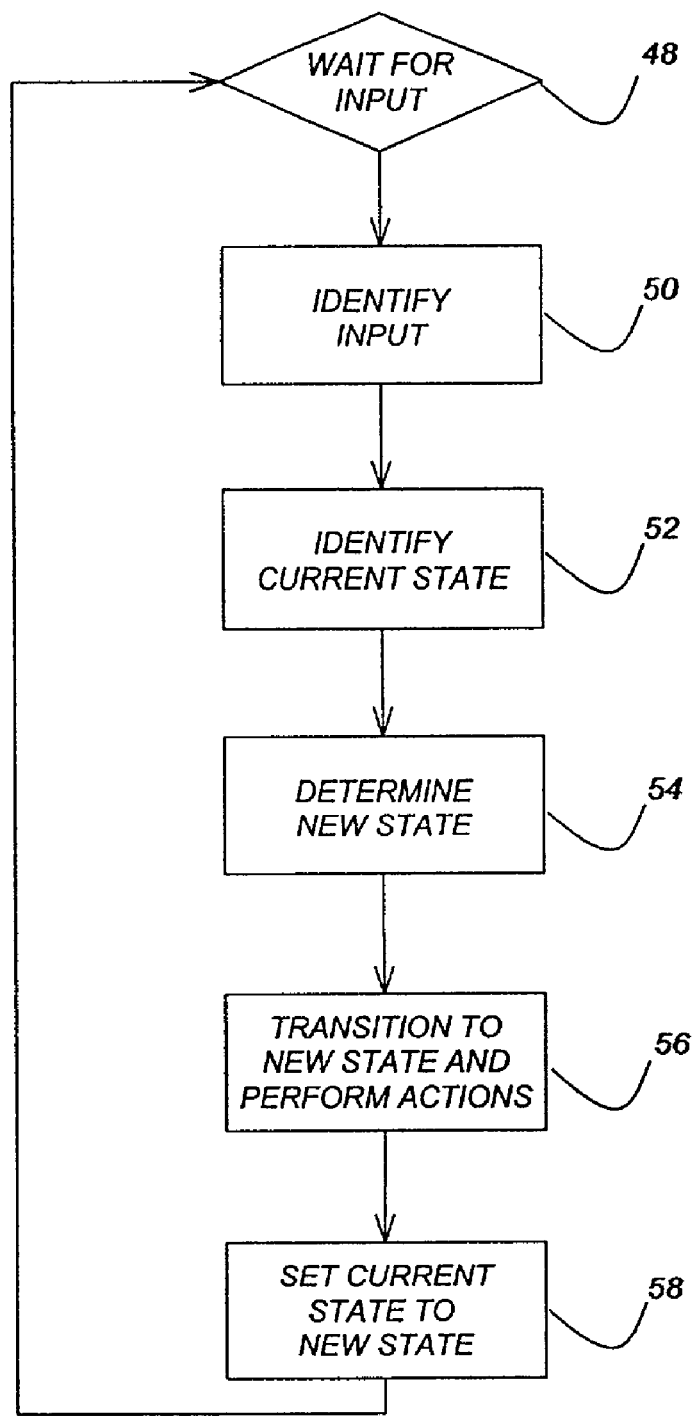
FIG. 5 is a flow chart that illustrates the general logic of an integrated development environment (IDE) in performing the steps of the present invention.

FIG. 5 is a flow chart that illustrates the general logic of the IDE 28 in performing the steps of the present invention, and more specifically, in performing the steps necessary for handling the user interface for the IDE 28. In the IDE 28, operations are performed when transitions are made, based upon input events, from present or current states to new states.

Block 48 represents the IDE 28 waiting for an input event (e.g., a mouse button click or keyboard entry). It should be appreciated that during this time, other system tasks, e.g., file, memory, and video tasks, etc., may also be carried out. When an input event occurs, control passes to block 50 to identify the input event. Based upon the input event, as well as the current state of the IDE 28 determined in block 52, a new state is determined in block 54. In block 56, a transition is made to the new state and the IDE 28 performs any actions required for the transition. In block 58, the current state is set to the previously determined new state, and control returns to block 48 to wait for more input events.

The specific operations that are performed by block 56 when transitioning between states will vary depending upon the current state and the input event. The various operations required to implement the present invention represent particular events handled by the IDE 28. However, it should be appreciated that these events represent merely a subset of all of the events handled by the IDE 28, and the workstation 12 executing the IDE 28.

Figure 6:
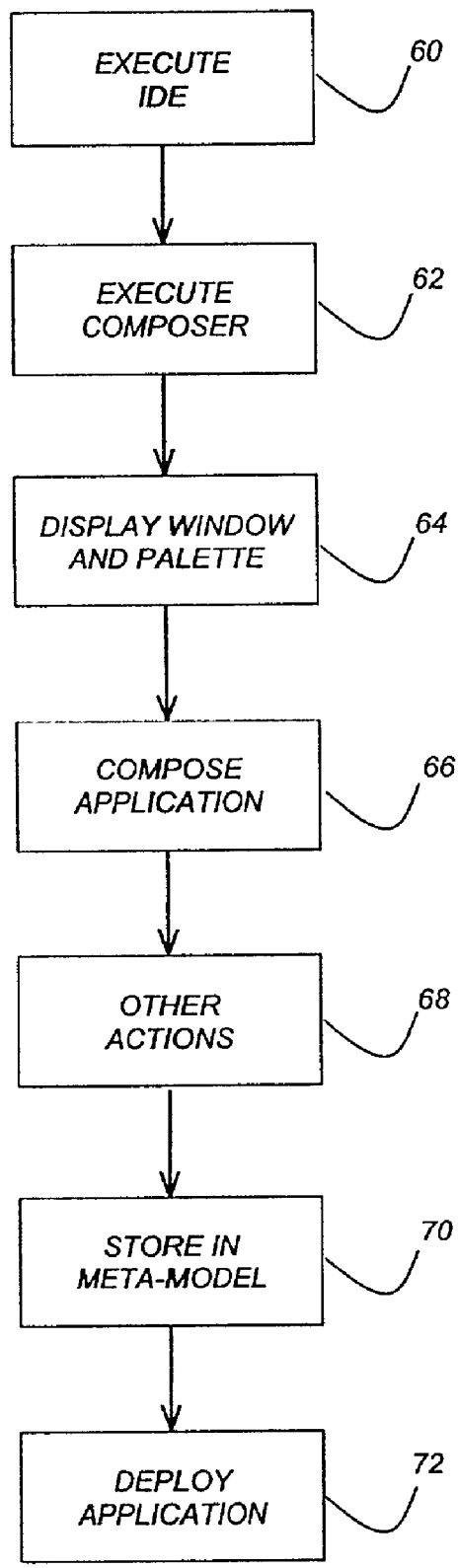
FIG. 6 is a flow chart that illustrates the general logic for executing a Topological Multi-Tier Business Application Composer according to the preferred embodiment of the present invention.

FIG. 6 is a flow chart that illustrates the general logic for executing the Topological Multi-Tier Business Application Composer 30 of the IDE 28 according to the preferred embodiment of the present invention.

Block 60 represents the Integrated Development Environment (IDE) 28 being executed by a computer, so that it can be used by a developer to create and maintain a multi-tier business application on a multiple tier computer network.

Block 62 represents the Topological Multi-Tier Business Application Composer 30 of the IDE 28 being executed by the computer, so that it can be used by the developer to graphically design, develop, maintain, build, test, debug, and deploy the multi-tier business application.

Block 64 represents the window 42 and a palette 44 of the Composer 30 being displayed on the computer, wherein the palette 44 contains graphical constructs representing tiers and components of the tiers, wherein the components of the tiers are selected from a group comprising workstations, servers, application files, connections, data paths, user-defined processes, and other user-defined elements.

Block 66 represents icons being dragged from the palette 44 onto the window 42, and thereafter connected together.

Block 68 represents the Composer 30 being used to perform one or more other actions, such as creating the tiers involved in the multi-tier business application, specifying the components of each of the tiers, interconnecting the components of each of the tiers, and specifying properties that identify each of the tiers and the components of the tiers.

In Blocks 66 and 68, as the developer interacts with the Composer 30, the actions that are performed may be recorded in an "Undo" list, so that the developer has the option of undoing these actions, up to the point where the last "save" was performed. The actions recorded in the Undo list are not committed to the Meta-model 32 until the developer explicitly performs a "Save" or "Save As" operation, or in the event that an auto-save agent is present and active in the IDE 28.

Block 70 represents the Meta-model 32 capturing information entered via the Composer 30 and persistently storing 34 the information. In addition to the multi-tier business application, the information stored in the Meta-model 32 may also include: (1) hardware, software, and communication attributes, such as I/O capacity-throughput, translation/transformation requirements, processing speed, resource storage, and cache capacity; (2) additional modulating factors, such as time dependent variables, and (3) other information. Such additional information may be utilized in analyzing an optimal deployment configuration for the multi-tier business application, or in determining optimal performance during peak usage.

Block 72 represents the Composer 30 being used to deploy the multi-tier business application. This step is performed when the developer is satisfied with the composition and details of the multi-tier business application. In this Block, the developer can specify deployment parameters, which are then persistently stored 34 within the Meta-model 32. Examples of deployment parameters may include: machine names, IP addresses, installation paths, installation user-id, required permissions, build options, services, as well as other information.

Figure 7:
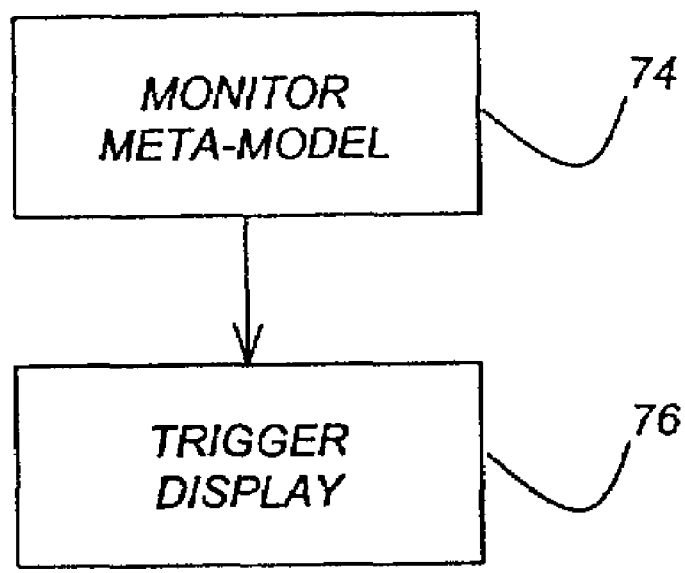
FIG. 7 is a flow chart that illustrates the general logic for executing the Interactive Agent of a Topological Multi-Tier Business Application Composer according to the preferred embodiment of the present invention.

FIG. 7 is a flow chart that illustrates the general logic for executing the Interactive Agent 36 of the IDE 28 according to the preferred embodiment of the present invention.

Block 74 represents the Interactive Agent 36 monitoring the Meta-model 32 for an occurrence of one or more specific events.

Block 76 represents the Interactive Agent 36 triggering the display of a graphical element in the IDE 28 to interact with the developer, wherein the graphical element includes context information comprising a list of suggested and recommended actions.

In Block 74, if the Interactive Agent 36 includes a Novice mode, then the Interactive Agent 36 can be triggered in the Novice Mode when an event occurs, such as the following events:

Opening a new window 42 for the first time, which may result in the display of information that informs the developer of the functions and features available in the window 42;

Adding a new type of graphical element to a window 42;

Repetitiously adding the same type of graphical element to the window 42;

Transitioning from one window 42 to another window 42;

Defining more than a predetermined number of tiers;

Defining less than a predetermined number of tiers;

Defining more than a predetermined number of workstations;

Defining less than a predetermined number of workstations;

Defining more than a predetermined number of applications;

Defining less than a predetermined number of applications;

Defining more than a predetermined number of data paths;

Defining less than a predetermined number of data paths;

Failure to use a specified feature in a window 42 (e.g., based on an apparent non-awareness of the feature).

Also in Block 74, if the Interactive Agent 36 includes an Advanced mode, then the Interactive Agent 36 can be triggered in the Advanced Mode when an event occurs, such as a possible non-optimization or imbalance in a portion of the multi-tier business application based upon an heuristic analysis of the information gathered by the Composer 30 and stored within the Meta-model 32. The possible non-optimization is determined by examining attributes of the multi-tier business application stored within the Meta-model 32.

CONCLUSION

This concludes the description of the preferred embodiment of the invention. The following describes some alternative embodiments for accomplishing the present invention. Those skilled in the art will recognize many modifications may be made to this exemplary embodiment without departing from the scope of the present invention. For example, those skilled in the art will recognize that any combination of the above components, or any number of different components, including different logic, data, different peripherals, and different devices, may be used to implement the present invention, so long as similar functions are performed thereby.

In summary, the present invention discloses a computer-implemented Integrated Development Environment (IDE) for use in constructing a multi-tier business application for a multiple tier computer network. The IDE is used to create and maintain the multi-tier business application quickly and easily on the multiple tier computer network. The IDE includes a Topological Multi-Tier Business Application Composer and associated Meta-model, wherein the Composer allows the developer to graphically design, develop, maintain, build, test, debug, and deploy the multi-tier business application and the graphical representation of the multi-tier business application is then persistently stored in the Meta-model. The IDE also includes an Interactive Agent that monitors the Meta-model for an occurrence of a specific event and then trigers the display of a dialog box or other graphical element in the user interface of the IDE to interact with the developer by displaying context information comprising a list of suggested and recommended actions that advance the creation of the multi-tier business application.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system of developing multi-tier business applications, comprising:
    performed by a computer processor using memory;
    an Integrated Development Environment (IDE), executed by a computer, for creating and maintaining a multi-tier business application on a multiple tier computer network, wherein the IDE includes a Topological Multi-Tier Business Application Composer that is used by a developer to graphically create and maintain the multi-tier business application, a Meta-model that captures and persistently stores information entered via the Composer, and an Interactive Agent that monitors the Meta-model for an occurrence of an event that comprises a possible non-optimization in a portion of the multi-tier business application based upon an heuristic analysis of information gathered by the Composer and stored within the Meta-model, wherein the Interactive Agent operates from a knowledge base stored as a part of the Meta-model, and the knowledge base is structured in such a way that the occurrence of the event causes the Interactive Agent to access the knowledge base to identify context information comprising a list of suggested and recommended actions for the event, in order to trigger a display of a graphical element including the context information in the Composer to interact with the developer.

2. The system of claim 1, wherein the Interactive Agent includes a Novice mode, and the Interactive Agent is triggered in the Novice Mode when an event occurs that is selected from a group comprising:
    opening a new window;
    adding a new type of graphical element to a window;
    repetitiously adding a same type of graphical element to a window;
    transitioning from one window to another window;
    defining more than a predetermined number of tiers;
    defining less than a predetermined number of tiers;
    defining more than a predetermined number of workstations;
    defining less than a predetermined number of workstations;
    defining more than a predetermined number of applications;
    defining less than a predetermined number of applications;
    defining more than a predetermined number of data paths;
    defining less than a predetermined number of data paths;
    failure to use a specified feature in a window; and
    an apparent non-awareness of a specified feature in a window.

3. The system of claim 1, wherein the possible non-optimization is determined by examining attributes of the multi-tier business application stored within the Meta-model.

4. The system of claim 1, wherein the Meta-model is updated and kept in synchronization with any updates made to the multi-tier business application via the Composer window.

5. A computer-implemented method for developing multi-tier business applications, comprising:
    creating and maintaining a multi-tier business application on a multiple tier computer network using an Integrated Development Environment (IDE) executed by a computer, wherein the IDE includes a Topological Multi-Tier Business Application Composer that is used by a developer to graphically create and maintain, the multi-tier business application, a Meta-model that captures and persistently stores information entered via the Composer, and an Interactive Agent that monitors the Meta-model for an occurrence of an event that comprises a possible non-optimization in a portion of the multi-tier business application based upon an heuristic analysis of information gathered by the Composer and stored within the Meta-model, wherein the Interactive Agent operates from a knowledge base stored as a part of the Meta-model, and the knowledge base is structured in such a way that the occurrence of the event causes the Interactive Agent to access the knowledge base to identify context information comprising a list of suggested and recommended actions for the event, in order to trigger a display of a graphical element including the context information in the Composer to interact with the developer.

6. The method of claim 5, wherein the Interactive Agent includes a Novice mode, and the Interactive Agent is triggered in the Novice Mode when an event occurs that is selected from a group comprising:
    opening a new window;
    adding a new type of graphical element to a window;
    repetitiously adding a same type of graphical element to a window;
    transitioning from one window to another window;
    defining more than a predetermined number of tiers;
    defining less than a predetermined number of tiers;
    defining more than a predetermined number of workstations;
    defining less than a predetermined number of workstations;
    defining more than a predetermined number of applications;
    defining less than a predetermined number of applications;
    defining more than a predetermined number of data paths;
    defining less than a predetermined number of data paths;
    failure to use a specified feature in a window; and
    an apparent non-awareness of a specified feature in a window.

7. The method of claim 5, wherein the possible non-optimization is determined by examining attributes of the multi-tier business application stored within the Meta-model.

8. The method of claim 5, wherein the Meta-model is updated and kept in synchronization with any updates made to the multi-tier business application via the Composer window.

9. An article of manufacture comprising a computer-readable storage device or storage medium embodying instructions that, when read and executed by a computer, results in the computer performing a method for developing multi-tier business applications, the method comprising:

creating and maintaining a multi-tier business application on a multiple tier computer network using an Integrated Development Environment (IDE) executed by a computer, wherein the IDE includes a Topological Multi-Tier Business Application Composer that is used by a developer to graphically create and maintain the multi-tier business application, a Meta-model that captures and persistently stores information entered via the Composer, and an Interactive Agent that monitors the Meta-model for an occurrence of an event that comprises a possible non-optimization in a portion of the multi-tier business application based upon an heuristic analysis of information gathered by the Composer and stored within the Meta-model, wherein the Interactive Agent operates from a knowledge base stored as a part of the Meta-model, and the knowledge base is structured in such a way that the occurrence of the event causes the Interactive Agent to access the knowledge base to identify context information comprising a list of suggested and recommended actions for the event, in order to trigger a display of a graphical element including the context information in the Composer to interact with the developer.

10. The article of manufacture of claim 9, wherein the Interactive Agent includes a Novice mode, and the Interactive Agent is triggered in the Novice Mode when an event occurs that is selected from a group comprising:

opening a new window;

adding a new type of graphical element to a window;

repetitiously adding a same type of graphical element to a window;

transitioning from one window to another window;

defining more than a predetermined number of tiers;

defining less than a predetermined number of tiers;

defining more than a predetermined number of workstations;

defining less than a predetermined number of workstations;

defining more than a predetermined number of applications;

defining less than a predetermined number of applications;

defining more than a predetermined number of data paths;

defining less than a predetermined number of data paths;

failure to use a specified feature in a window; and an apparent non-awareness of a specified feature in a window.

11. The article of manufacture of claim 9, wherein the possible non-optimization is determined by examining attributes of the multi-tier business application stored within the Meta-model.

12. The article of manufacture of claim 9, wherein the Meta-model is updated and kept in synchronization with any updates made to the multi-tier business application via the Composer window.

\* \* \* \* \*